UNITED STATES PATENT OFFICE.

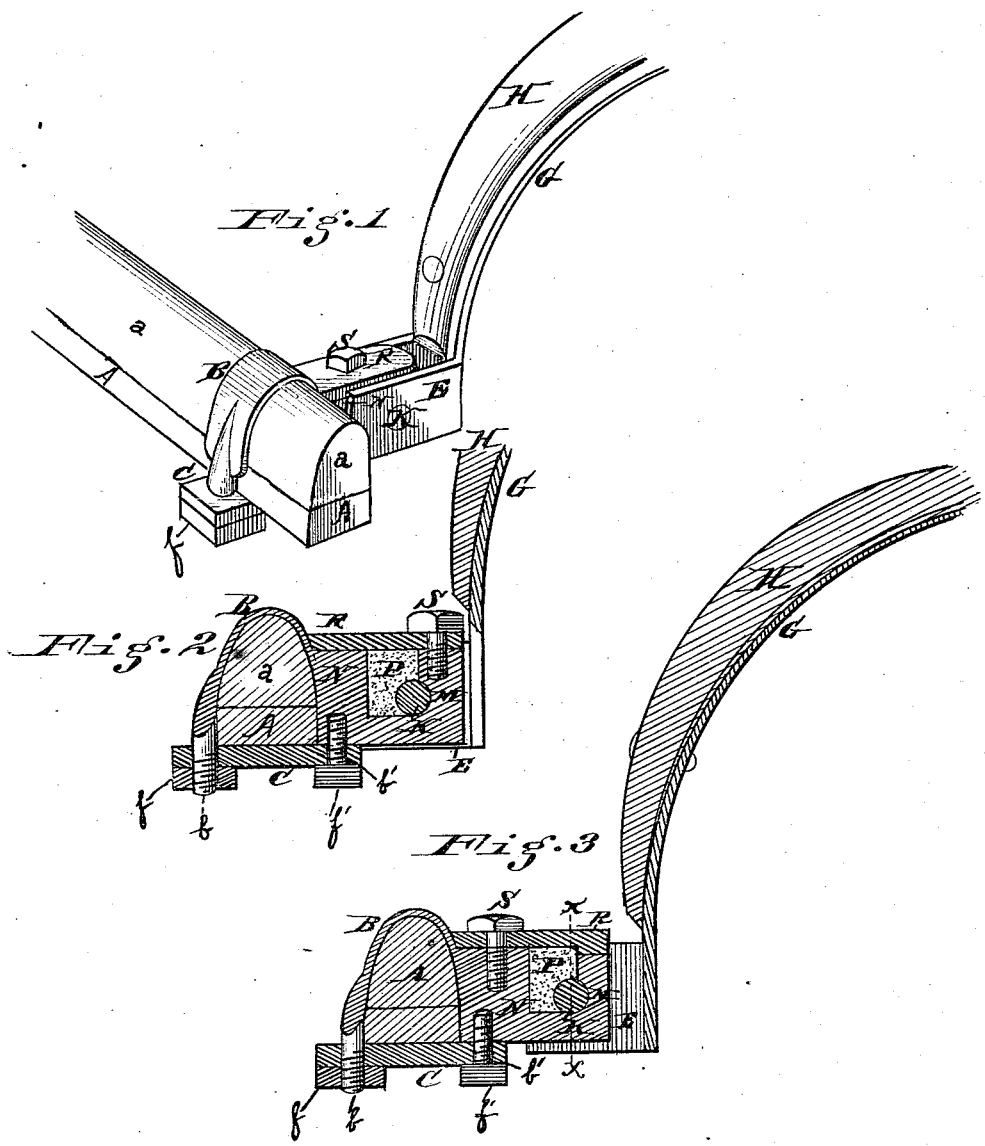

JAMES WALKER, OF CINCINNATI, OHIO.

IMPROVEMENT IN THILL-COUPLINGS.

Specification forming part of Letters Patent No. 161,366, dated March 30, 1875; application filed January 19, 1875.

*To all whom it may concern:*

Be it known that I, JAMES WALKER, a resident of the city of Cincinnati, in the State of Ohio, have invented certain new and useful Improvements in Carriage-Couplings for shafts and poles, of which the following is a specification:

My invention relates to a new and improved shackle or coupling, whereby the shafts or poles of a road-vehicle can be coupled to the axle of the same.

My invention, in general, consists in a recessed bearing attached to the axle-clip for the reception of a bearing-rod fixed to the rear end of the shaft or the stay-rods of the pole, and for the further reception of a piece of rubber held in place and compressed by a cap, the whole being disposed in such a manner as to secure the following results: In the first place, my improvements furnish a safe, reliable, and substantial coupling for the shafts or poles of vehicles, whereby the shafts can be easily and quickly exchanged for the pole, or the pole for the shafts. In the second place, my improved bearing attached to the axle-clip afford an immediate support for the shafts or pole the moment they are placed in said bearings. Thirdly, the screw-thread of that bolt which holds the bearing-rod to the shaft or pole in place in the bearings, and compresses the rubber, is preserved from the injury to which the screw-thread of the bolt, which, in the ordinary coupling, holds the shaft-eye to the lips of the axle-clip, is subjected. In the fourth place, my improvements enable me to so locate this screw-bolt that it will not shake loose, and so that it can be conveniently reached, and can be removed from or inserted in the iron containing the bearing without risk of scratching the paint. In the fifth place, I dispense with that nut, which, in the ordinary coupling, secures the eyebolt in place in the lips of the clip. Lastly, my improvements secure a complete compression of the rubber in all directions, and cause it to prevent all rattling of the coupling, and at the same time provide that the rubber shall afford no annoying resistance to the attachment of the shafts or poles to the axle, or to their removal therefrom.

In the accompanying drawings making part of this specification, Figure 1 represents in perspective a shaft-coupling embodying my improvements. Fig. 2 represents in vertical section a modification of the coupling shown in Fig. 1, said modification also being of my invention, said section being taken across the axle. Fig. 3 represents a vertical section of the coupling shown in Fig. 1, said section being made at right angles to the axle, and Fig. 4 represents a modification of my improved cap, whereby the rubber is compressed and the shaft-bearing is held securely to the bearing.

A designates the iron axle of a vehicle. The clip B and the bearing-iron C are preferably made in one and the same piece. The rear end $b$ of the clip has the usual screw-thread. A bolt, $b'$, projects from the under side of the bearing-iron C, and is also provided with a screw-thread, $d$. These bolts $b$ and $b'$ pass through the ordinary iron connecting-piece, D, and the latter is secured against the under side of the axle A by means of the nuts $f f'$, one of which is screwed upon each bolt $b\ b'$ below the iron D. The bearing-iron C is located on the clip, so that it extends horizontally from the front portion of the axle, the bottom of the latter and of the bearing-iron being in the same horizontal plane. It is preferably as wide as the rear end of the shaft, and vertically about two-thirds as thick as the united vertical thickness of the axle A and axle-bar $d$. The bearing-iron extends from the axle clip sufficiently far to admit of allowing the vertical lips E easy play and sufficient purchase to steady the shafts. One end of each lip is attached to (preferably wrought with) the strap-iron G, which is bolted to the under side of the rear end of the shaft H. The space between the lips is a trifle wider than the width of the bearing-iron, in order that the bearing-rod may be easily inserted in the bearing or removed therefrom. These lips extend sufficiently above the top of the bearing-iron to act as guards to retain the cap from horizontally slipping off. K designates the bearing-rod, preferably round, which extends horizontally between and connects the lips E, and whose axial line is at right angles to the plane of the lips. This bearing-rod is placed sufficiently near the open end of the lips to allow of its ready insertion in and removal from the bearing, and also so that the shaft shall have free play, and the strap-iron G not interfere with the corners of the bearing-iron. In the top of the latter iron is a recess, M, extending across the bearing-iron and considerably wider than the bearing-rod, so as to allow the latter to readily enter the recess. The recess is also sufficiently deep to admit of considerable thickness of rubber being placed over the bearing-rod when the latter rests upon its bearing. At the front side of the bottom of the recess is the bearing N, the front side of the recess here being preferably a trifle hollowed out to admit a small part of the round of the bearing-rod, and so that the rubber may better retain the bearing-rod in position. The rubber P is cut into the shape shown in the drawing, being somewhat recessed in its front lower corner. The rubber should be vertically so thick that when its bottom rests upon the bottom of the recess its top shall be a little above the upper plane of said recess. A cap, R, of the same width and length as the top of the bearing-iron fits upon the latter and is secured to the same by a screw-bolt, S, which passes through said cap R and screws into a vertical female screw in the top of the bearing-iron C behind the recess M. In the modification of my invention, shown in Fig. 2, the screw-bolt S passes through the cap and enters the top of the bearing-iron in front of the recess M. And this difference in the position of the bolt S is the only difference between the couplings shown in Figs. 1 and 2 of drawing.

The mode in which my improvements are operated is as follows:

The rubber P is removed from the recess and the shafts placed so that one of the bearing-rods, K, shall enter each recess, M, and rest on the lower front corner of the bearing N. The rubber P is then inserted in the recess so that its near lower portion of it is wedged between the bearing-rod and the back side of the recess. The cap R is then placed upon the top of the bearing-iron and the bolt S is passed through the cap and screwed into the bearing-iron bringing the cap down upon the rubber and compressing the latter against the bearing-rod and spreading the rubber laterally so that it touches the inner surfaces of the lips E, thus securing the bearing-rod in place and preventing all rattling of the latter in the bearing, or of the lips E against the sides of the bearing-iron. When it is desired to exchange the shafts for the pole, it is but the work of a moment to unscrew the bolt S, remove the cap, lift out the rubber and the bearing of the shafts, place the bearing-rods of the pole in the bearing N, and reinsert the rubber, and screw down the cap as was done in the case of the shaft-bearing rods. Should the rubber at any time become so compressed as to be inoperative because it no longer projects above the top of the bearing-iron, when placed within the recess it can be made operative by lifting the cap and placing a chip or stone, or the like, on top of the rubber and below the cap and then screwing down the cap.

It will be obvious to any one who has carefully read the foregoing description of the coupling, and the mode of using it, that the advantages specified in the opening of this specification are fully realized. It is unnecessary to recapitulate those advantages here.

What I claim as new, and desire to secure by Letters Patent, is—

In a thill coupling the combination of recessed bearing-iron C, rubber P, cap R, bolt S, lips E, and bearing-rod K, substantially as set forth.

JAMES WALKER.

Attest:
D. P. KENNEDY,
R. J. GANETTÉ.